United States Patent [19]

Kaneko

[11] Patent Number: 5,090,634
[45] Date of Patent: Feb. 25, 1992

[54] SPEED CHANGER FOR FISHING REELS

[75] Inventor: Kyoichi Kaneko, Tokyo, Japan

[73] Assignee: Daiwa Seiko Inc., Tokyo, Japan

[21] Appl. No.: 534,227

[22] Filed: Jun. 7, 1990

Related U.S. Application Data

[62] Division of Ser. No. 337,005, Apr. 12, 1989, Pat. No. 4,966,335.

[30] Foreign Application Priority Data

| May 13, 1988 [JP] | Japan | 63-116654 |
| Aug. 11, 1988 [JP] | Japan | 63-200477 |
| Aug. 26, 1988 [JP] | Japan | 63-111700 |

[51] Int. Cl.$^5$ .......................................... A01K 89/015
[52] U.S. Cl. ................................. 242/255; 242/268; 475/311
[58] Field of Search ............... 242/255, 257, 268, 267; 74/781 R; 475/311, 312

[56] References Cited

U.S. PATENT DOCUMENTS

| 463,377 | 11/1891 | Atkinson | 242/255 |
| 2,335,752 | 11/1943 | Geiger | 242/255 |
| 2,615,352 | 10/1952 | Mies | 242/255 |
| 2,836,995 | 6/1958 | Heddy | 242/255 |
| 2,918,227 | 12/1959 | Mauborgne | 242/255 |
| 3,215,360 | 11/1965 | Chambers | 242/255 |
| 3,612,437 | 10/1971 | Allebach | 242/268 |
| 4,566,655 | 1/1986 | Young | 242/268 |
| 4,927,095 | 5/1990 | Young | 242/268 |
| 4,966,335 | 10/1990 | Kaneko | 242/255 |

*Primary Examiner*—Katherine Matecki
*Attorney, Agent, or Firm*—Browdy and Neimark

[57] ABSTRACT

A speed changer for fishing reels, capable of carrying out a manual take-up speed changing operation easily and smoothly without damaging the surfaces of the teeth of the gears provided therein even when a take-up load is imparted on a spool, consisting of a driving gear-carrying driving shaft, a handle-carrying handle-turning tube mounted on the outer portion of the driving shaft via a one-way clutch so that the handle-turning tube can be turned unitarily with the driving shaft in the fishing line take-up direction, a pinion mounted on a spool-turning spool shaft, with which pinion the driving gear is meshed, planetary gears supported rotatably on shafts and provided in the inner end portion of the handle-turning tube, an internal gear mounted on and rotatable with the driving shaft, with which internal gear the outer portions of the planetary gears are meshed, a sun gear fitted rotatably around the driving shaft, with which sun gear the inner portions of the planetary gears are meshed, a change over member having locking teeth at the outer circumferential portion thereof and formed unitarily with the sun gear, and a stopper pawl formed so that the stopper pawl can be engaged with and disengaged from the locking teeth by an operating member.

5 Claims, 10 Drawing Sheets

SPEED CHANGER FOR FISHING REELS

This is a divisional of application Ser. No. 07/337,005, now U.S. Pat. No. 4,966,335 issued Oct. 30, 1990.

BACKGROUND OF THE INVENTION

1. Field of the Invention

This invention relates to a fishing reel, and more particularly to a speed changer for spool rotating fishing reels.

2. Description of the Prior Art

The known means for changing the take-up speed of a spool in a fishing reel include an automatic speed change system adapted to automatically change the take-up speed of a spool in accordance with the magnitude of a take-up load on a fishing line, and a manual speed change system adapted to change the take-up speed through a manual switching operation.

The automatic take-up speed change system seems to be convenient but, when an angler desires to take up the fishing line at a high speed or a low speed at his own will irrespective of the take-up load on the fishing line, the take-up speed cannot be changed. In such a case, the manual speed change system is conveniently used.

However, in a conventional manual speed change system of this kind, a high-speed driving gear and a low-speed gear mounted on a handle shaft are switched so as to be meshed with a high-speed pinion or a low-speed pinion both of which are mounted on a spool shaft, as disclosed in Japanese Utility Model Laid-open No. 182779/1985. In addition, every time such a switching operation is carried out, the high- or low-speed driving gear and high- or low-speed pinion are meshed with each other from a disengaged state. Therefore, when a take-up load is imparted to the fishing line, the driving gear switching and meshing operations cannot be smoothly carried out. Such gear switching and meshing operations cause the meshed surfaces of the gear and pinion to be damaged or worn easily, and make it necessary to increase the dimensions of the fishing reel.

SUMMARY OF THE INVENTION

An object of the present invention is to provide a speed changer for fishing reels, which is free from the above-mentioned drawbacks encountered in a manual speed changer of this kind, and which is capable of changing a take-up speed of a spool easily and smoothly by hand carrying out a wide range of fishing operations in accordance with the fishing condition.

The first characteristic of the present invention resides in a fishing reel, in which a planetary gear mechanism consisting of a sun gear and planetary gears is utilized so as to maintain a pinion on a spool shaft and a driving gear for turning the pinion in a constantly meshed state, and engage and disengage a stopper pawl with and from the locking teeth of a change-over member provided on the sun gear, whereby the fishing line take-up speed is changed to a higher or lower level to enable the speed switching resistance to be minimized even when a take-up load is imparted on the spool, in such a manner that a manual take-up speed changing operation can be carried out easily and smoothly, and prevent the meshed surfaces of the teeth of the pinion and driving gear and those of the teeth of the sun gear and planetary gears from being damaged or worn.

The second characteristic of the present invention resides in a fishing reel in which during a high-speed or low-speed take-up operation the pinion and driving gear do not receive frictional resistance which causes them to be turned idly, whereby a fishing line take-up operation can be carried out lightly without causing the take-up efficiency to decrease.

The third characteristic of the present invention resides in a fishing reel in which the driving gear meshed with the pinion can be provided with a drag mechanism similar to the drag mechanism in a conventional fishing reel of this kind, whereby both the speed changing function and dragging function are provided compactly.

The fourth characteristic of the present invention resides in a fishing reel, which is capable of carrying out a manual take-up speed changing operation having the above-mentioned features, a braking force regulatable brake member being also engaged with the locking teeth of the change-over member so as to enable the take-up speed to be changed automatically in accordance with a take-up load on the fishing line, whereby a wider range of fishing operation can be carried out in accordance with the fishing condition.

The fifth characteristic of the present invention resides in a fishing reel capable of changing the take-up speed to a higher or lower level speedily and easily by the thumb of a hand holding the reel while controlling the handle by the other hand, to enable the take-up speed to be changed more speedily in accordance with the fishing condition, and a fishing operation to be carried out smoothly and easily.

The above and other objects as well as advantageous features of the invention will become apparent from the following description of the preferred embodiments taken in conjunction with the accompanying drawings.

DESCRIPTION OF THE PREFERRED EMBODIMENTS

Figure 1:
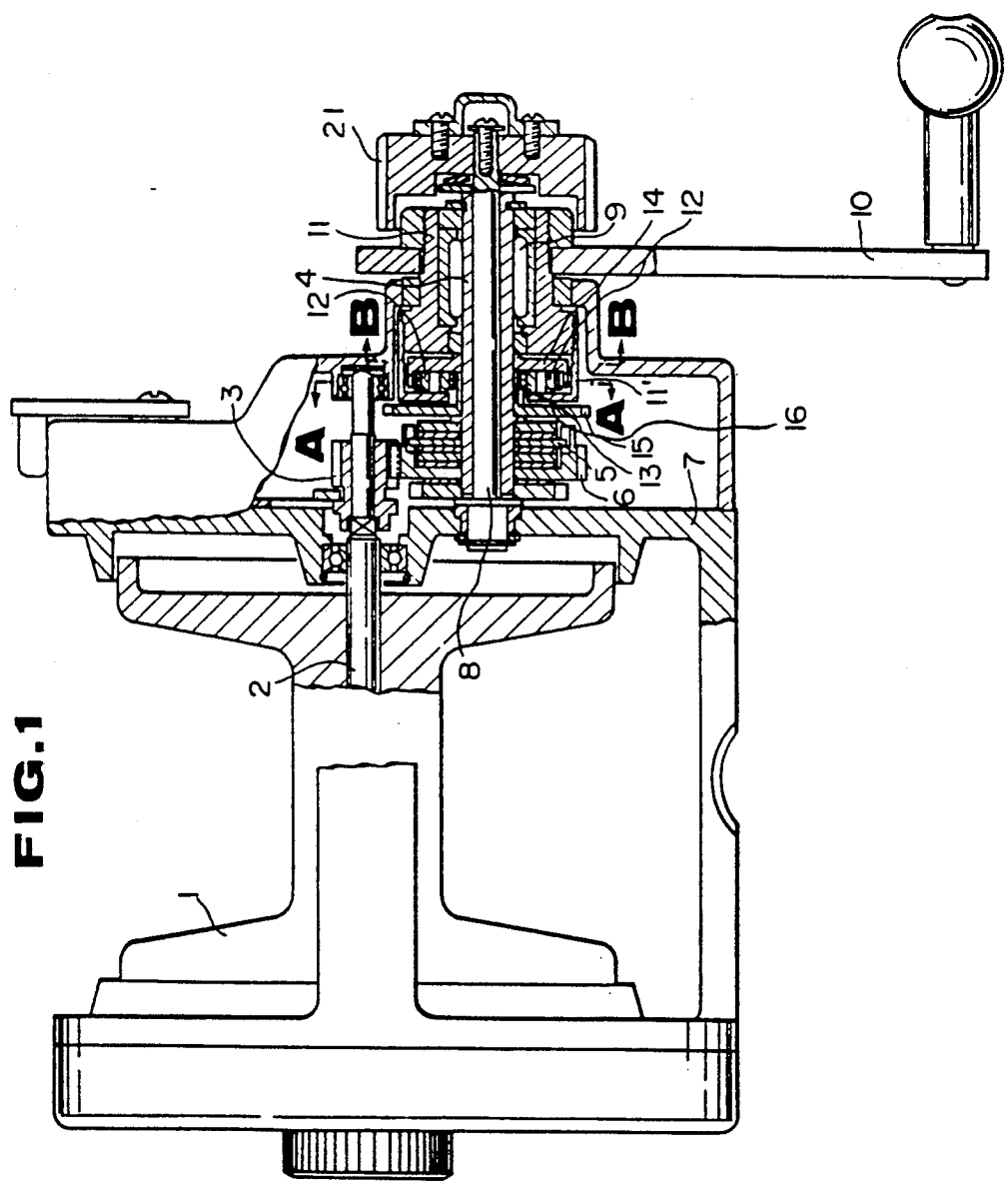
FIG. 1 is a partially sectioned front elevation of an embodiment of the present invention.

The details of the present invention will now be described with reference to the drawings. A driving gear 6 mounted frictionally on a tubular driving shaft 4 via a frictional brake member 5 is meshed with a pinion 3 mounted on a locking portion of a spool shaft 2, on which a spool 1 is firmly fitted, in such a manner that the pinion 3 can be engaged with and disengaged from the locking portion. The driving shaft 4 is fitted around a rotatable support shaft 8, which projects from a frame 7, in such a manner that the driving shaft 4 can be turned or prevent itself from being turned and be axially moved.

A short handle-turning tube 11, which is adapted to be turned unitarily with the driving shaft 4 in the fishing line take-up direction only, and which has a handle 10 fixed thereto, is fitted around the driving shaft 4 via a one-way clutch 9 utilizing a needle bearing. A plurality of planetary gears 12, 12 ... arranged on the same circle are mounted rotatably on the front portion of the handle-turning tube 11 via a mount 11'.

The inner portions of the planetary gears 12, 12 ... are meshed with a sun gear 13 mounted rotatably on the driving shaft 4, and the outer portions of the same gears 12, 12 ... with an internal gear 14 engaged and rotatable with the driving shaft 4. A disc type change-over member 16 having locking teeth 15 at the outer circumferential portion thereof is also mounted unitarily on the sun gear 13, and a stopper paw 20 which is adapted to be operated by an operating member 18 supported pivotably on a reel side plate 17, and which is urged by a spring 19, is engaged disengageably with the locking teeth 15. A regulating screw 21 for regulating the contact pressure of the frictional brake member 5 is mounted on the outer end portion of the support shaft 8 so that the frictional binding force of the driving gear 6 with respect to the driving shaft 4 can be regulated to a higher or lower level.

Figure 2:
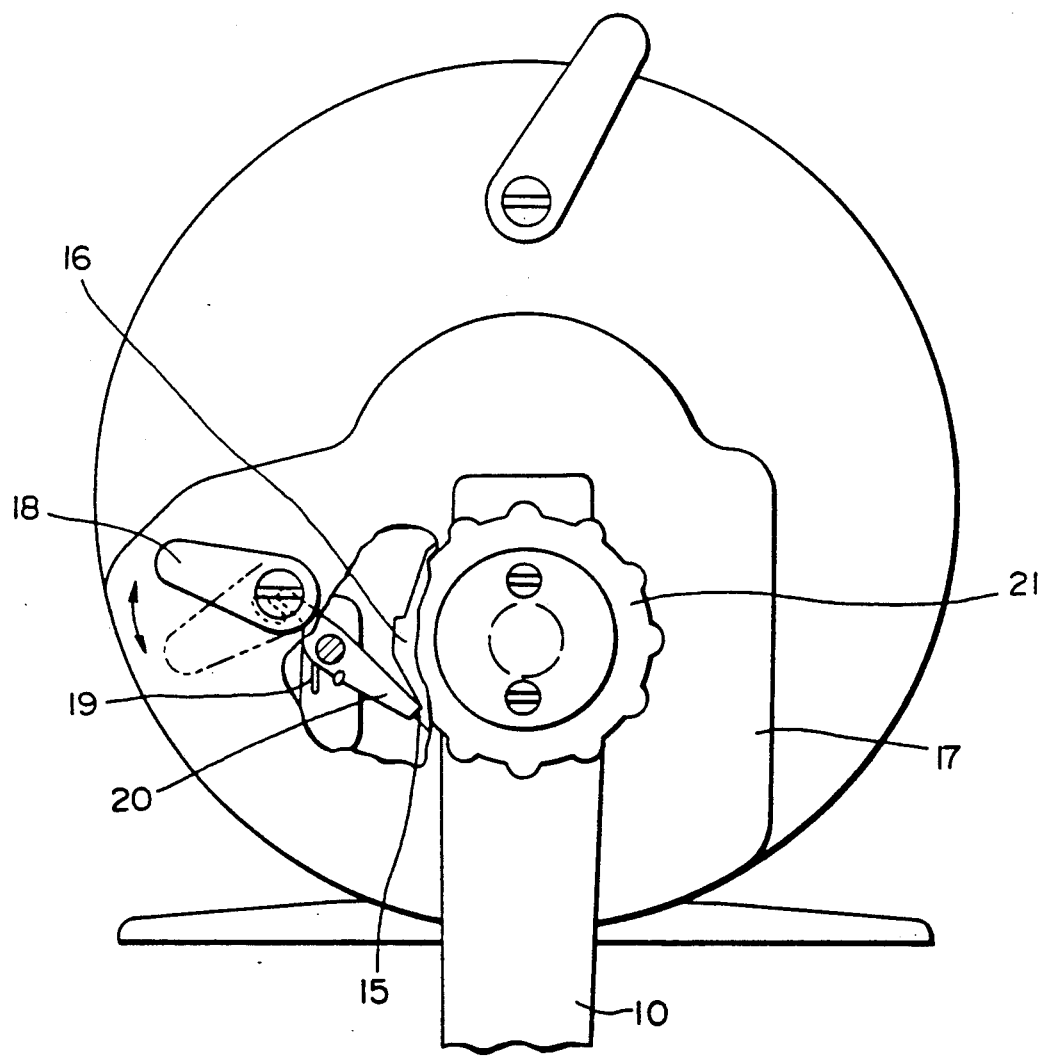
FIG. 2 is partially cutaway view in side elevation of the embodiment of FIG. 1.
Figure 3:
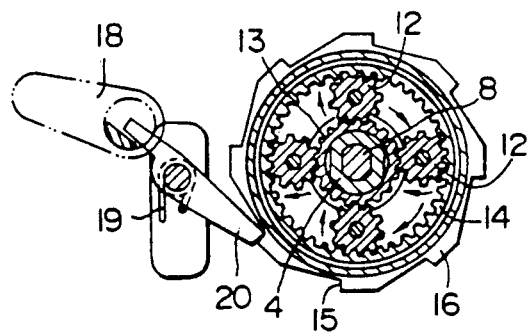
FIG. 3 is a sectional view of the same embodiment during a high-speed fishing line take-up operation, taken along the line A—A in FIG. 1.

Therefore, when the handle-turning tube 11 is turned in the fishing line take-up direction by the handle 10 with the stopper paw 20 engaged with the locking teeth 15 of the change-over member 16 by the operating member 18 as shown in FIGS. 2 and 3, to prevent the sun gear 13 from being turned in the fishing line take-up direction, the planetary gears 12 are turned around the driving shaft 4 as they rotate on their own axes, to rotate the internal gear 14 at an increased speed since the turning of the sun gear 13 is prevented by the stopper pawl 20, the rotation of the internal gear 14 enabling the spool 1 to be rotated at a high speed in the fishing line take-up direction via the driving shaft 4, driving gear 6, pinion 3, and spool shaft 2 which are connected unitarily to the internal gear 14.

Figure 4:
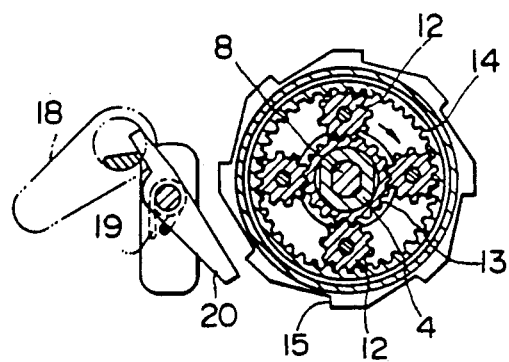
FIG. 4 is a sectional view of the same embodiment during a low-speed fishing line take-up operation, taken along the line A—A in FIG. 1.
Figure 5:
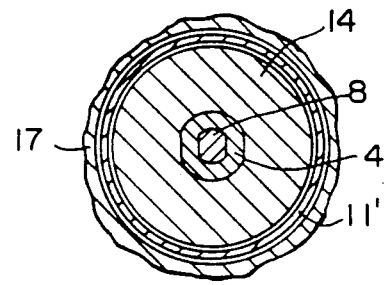
FIG. 5 is a sectional view of the same embodiment taken along the line B—B in FIG. 1.

When the handle-turning tube 11 is turned in the fishing line take-up direction by the handle 10 with the stopper pawl 20 disengaged from the locking teeth 15 as shown by a chain line in FIG. 4, by the operating member 18, the rotation of the same tube 11 is transmitted to the driving shaft 4 via the one-way clutch 9. Since the sun gear 13 is disengaged from the stopper paw 20, it is turned in accordance with the rotation of the internal gear 14 with the sun gear 13 meshed with the planetary gears 12, and the sun gear 13 does not receive the speed increasing effect of the planetary gear mechanism. Thus, the turning force of the handle 10 is transmitted to the spool 1 via the driving shaft 4, pinion 3 and spool shaft 2 to rotate the spool 1 in the fishing line take-up direction.

Figure 6:
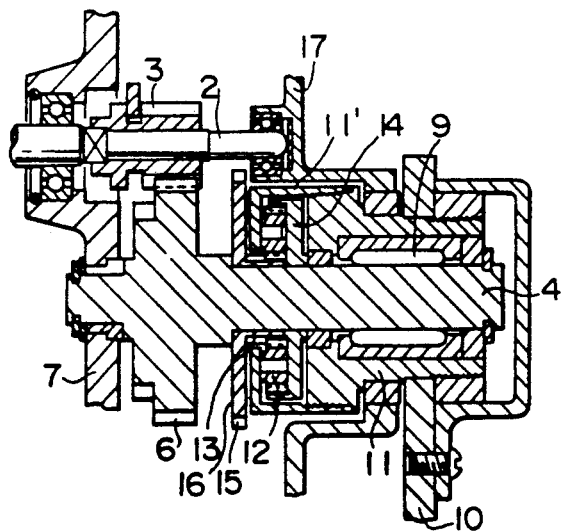
FIG. 6 is a sectional front elevation of a principal portion of another embodiment of the present invention.
Figure 7:
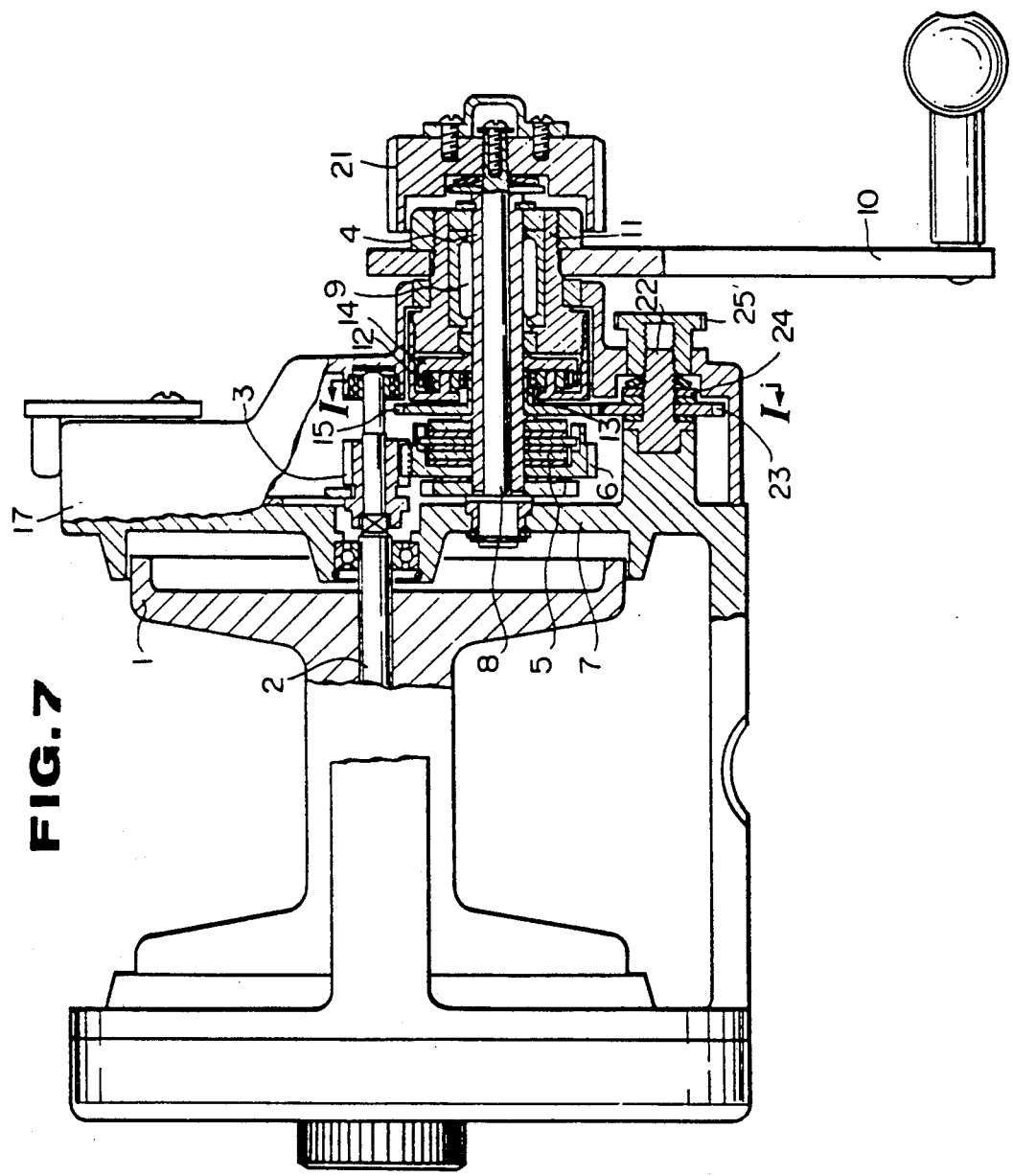
FIG. 7 is a partially sectioned front elevation of still another embodiment of the present invention.

In an embodiment shown in FIG. 6, a driving gear 6 is mounted firmly and directly on a driving shaft 4, and this driving shaft 4 is supported directly as well on a frame 7 so that the driving shaft 4 can be turned.

FIGS. 7-10 show an embodiment formed so that a fishing line take-up speed can be changed both manually and automatically. In this embodiment, a gear type brake member 23 is mounted on a support shaft 22 supported on a frame 7 of a reel side plate 17 similar to the reel side plate in the previously-described embodiment, via a frictional member 24, and the pressing force of the frictional member 24 is regulated by a regulating knob 25 screwed to the support shaft 22, so as to stop the turning of the brake member 23. The brake member 23 is engaged with locking teeth 15 of a change-over member 16.

Figure 8:
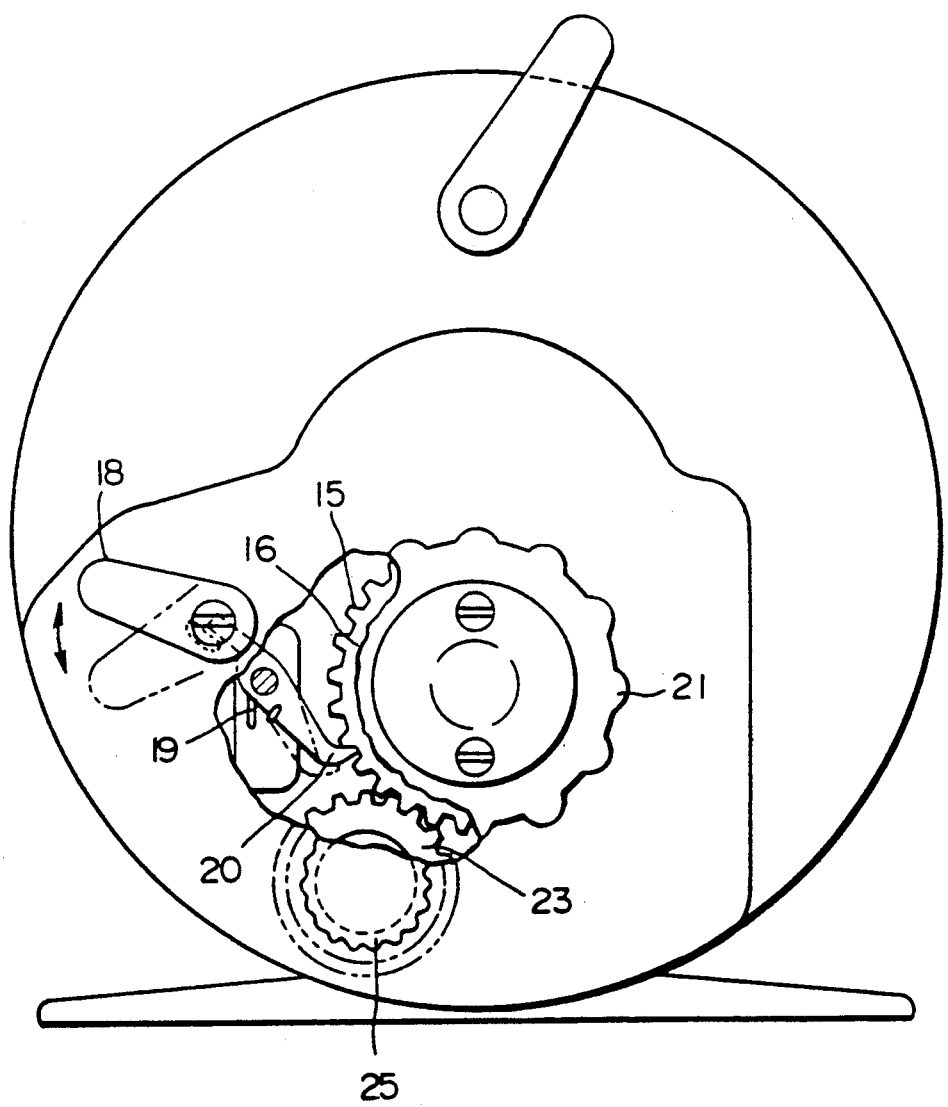
FIG. 8 is a partially cutaway view in side elevation of the embodiment of FIG. 7.
Figure 9:
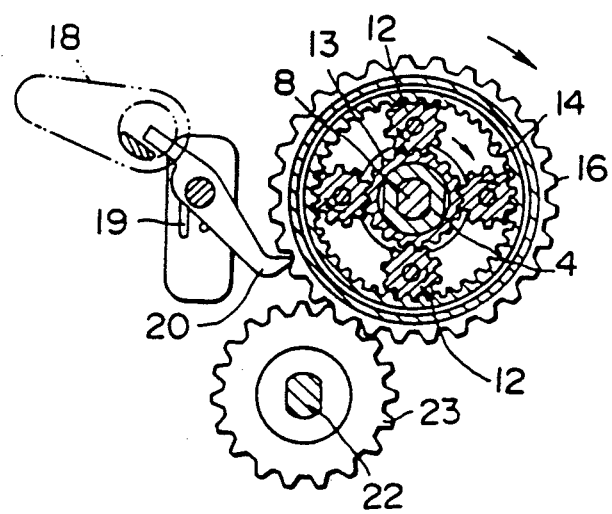
FIGS. 9 and 10 are sectional views illustrating the operations of the embodiment of FIG. 7 and taken along the line C—C in FIG. 7.

In order to carry out a manual speed changing operation, a stopper pawl 20 is engaged with the locking teeth 15 by an operating member 18 as shown in FIGS. 8 and 9, so as to keep a sun gear 13 not rotatable in the fishing line take-up direction, and a handle-turning tube 11 is turned in the fishing line take-up direction by a handle 10. Consequently, the planetary gears 12 are turned around a driving shaft 4 as they rotate on their own axes in the same manner as in the previous embodiment, to turn an internal gear 14 at an increased speed. The turning force of the internal gear 14 is transmitted to a spool 1 via the driving shaft 4, driving gear 6, pinion 3 and spool shaft 2, which are connected unitarily to the internal gear 14, so that the spool can be turned at a high speed in the fishing line take-up direction.

Figure 10:
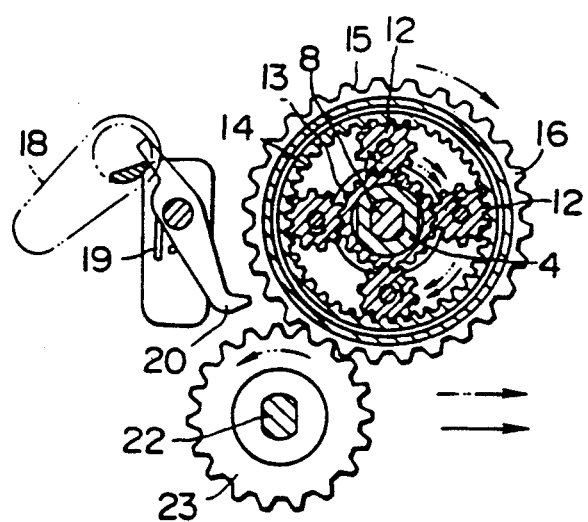

In order to change this high-speed take-up mode to a low-speed take-up mode by a manual operation, the braking force of the brake member 23 is set minimal by the regulating knob 25, and the stopper pawl 20 is then kept disengaged from the locking teeth 15 by the operating member 18 as shown in FIG. 10 with the handle-turning tube 11 turned in the fishing line take-up direction by the handle 10. As a result, the turning force of the tube 11 is transmitted to the driving shaft 4 via the one-way clutch 9, while the sun gear 13 engaged with the planetary gears 12 is turned in accordance with the turning of the internal gear 14 and does not receive the speed increasing effect of the planetary gear mechanism, the turning force of the driving gear 4 being transmitted to the spool 1 via the driving gear 6, pinion 3 and spool shaft 2 to turn the spool 1 at a low speed in the fishing line take-up direction.

In order to automatically change the fishing line take-up speed of the spool 1, the stopper pawl 20 is disengaged from the locking teeth 15 of the change-over member 16 by the operating member 18, and the braking force of the brake member 23 is set in accordance with the fishing conditions by the regulating knob 25.

When the handle 10 is then turned in the fishing line take-up direction, i.e., clockwise in FIG. 10, the handle-turning tube 11 is turned unitarily therewith by the one-way clutch 9. Since the turning of the sun gear 13 is prevented by the brake member 23, the planetary gears 12 are turned around the driving shaft 4 as they rotate on their own axes, to cause the internal gear 14 to be turned at an increased speed. The rotation of this internal gear 14 enables the spool 1 to be rotated at a high speed in the fishing line take-up direction via the driving shaft 4, frictional brake member 5, driving gear 6, pinion 3 and spool shaft 2.

When a take-up load given by a fish to the spool is then increased to cause the braking force of the brake member 23 to exceed a preset level, the rotation of the handle 10 in the fishing line take-up direction is transmitted to the driving shaft 4 via the handle-turning tube 11 and one-way clutch 9, so that the driving shaft 4 is directly connected to and rotated with the handle-turning tube 11. The sun gear 13 is turned in accordance with the rotation of the internal gear 14 with the sun gear kept meshed with the planetary gears 12, and the brake member 23 is slip-turned in accordance with the rotation of the sun gear 13, so that the turning of the planetary gears 12 on their own axes and around the driving shaft 4 are stopped. Thus, the take-up speed is changed automatically to a low level at which the sun gear 13 does not receive the speed increasing effect of the planetary gear mechanism. When the take-up load on the spool 1 has then decreased, the take-up speed is automatically changed to the high level again.

Figure 11:
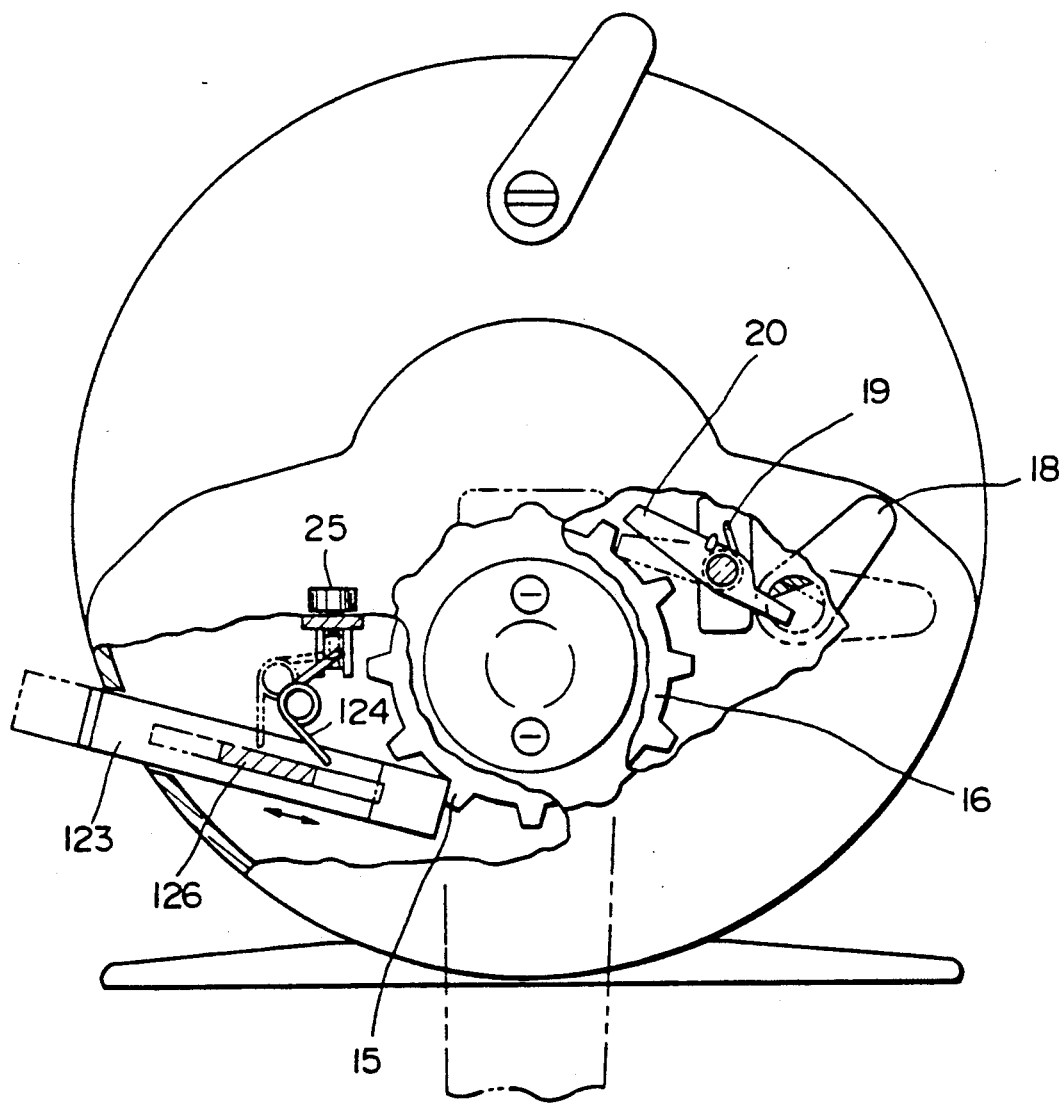
FIG. 11 is a partially cutaway view in side elevation of another example of a brake member of the present invention.

In an embodiment shown in FIG. 11, the braking force of a brake member 123 adapted to engage a locking tooth 15 is generated by utilizing a twisted coiled spring 124, the resilient force of which can be regulated by a regulating knob 125, instead of the pressing force of the frictional member 24 in the previously-described embodiment, and the slidable brake member 123 is engaged with a locking tooth 15 by the resilient force of the twisted coiled spring 124 via a guide 126.

Figure 12:
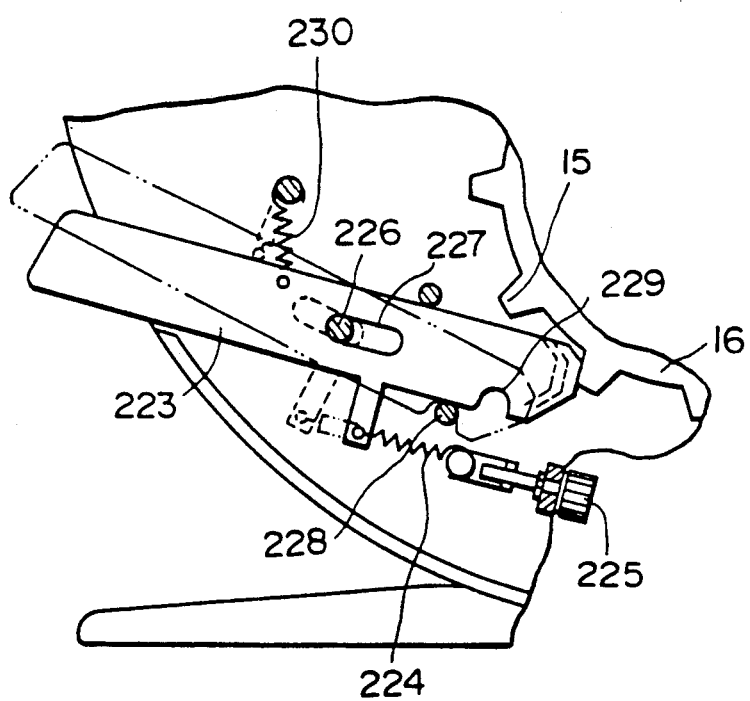
FIG. 12 is a side elevation of a principal portion of still another example of the brake member of the present invention.

In an embodiment shown in FIG. 12, a brake member 223 fitted around a pin 226 via an elongated bore 227 is engaged with a locking tooth 15 by a spring 224 the traction force of which can be regulated by a regulating knob 225, and provided with a locking recess 229 engageable with a locking projection 228 for keeping the brake member 223 spaced from the locking tooth 15, and a tension spring 230 for engaging the locking recess 229 with the locking projection 228.

Figure 13:
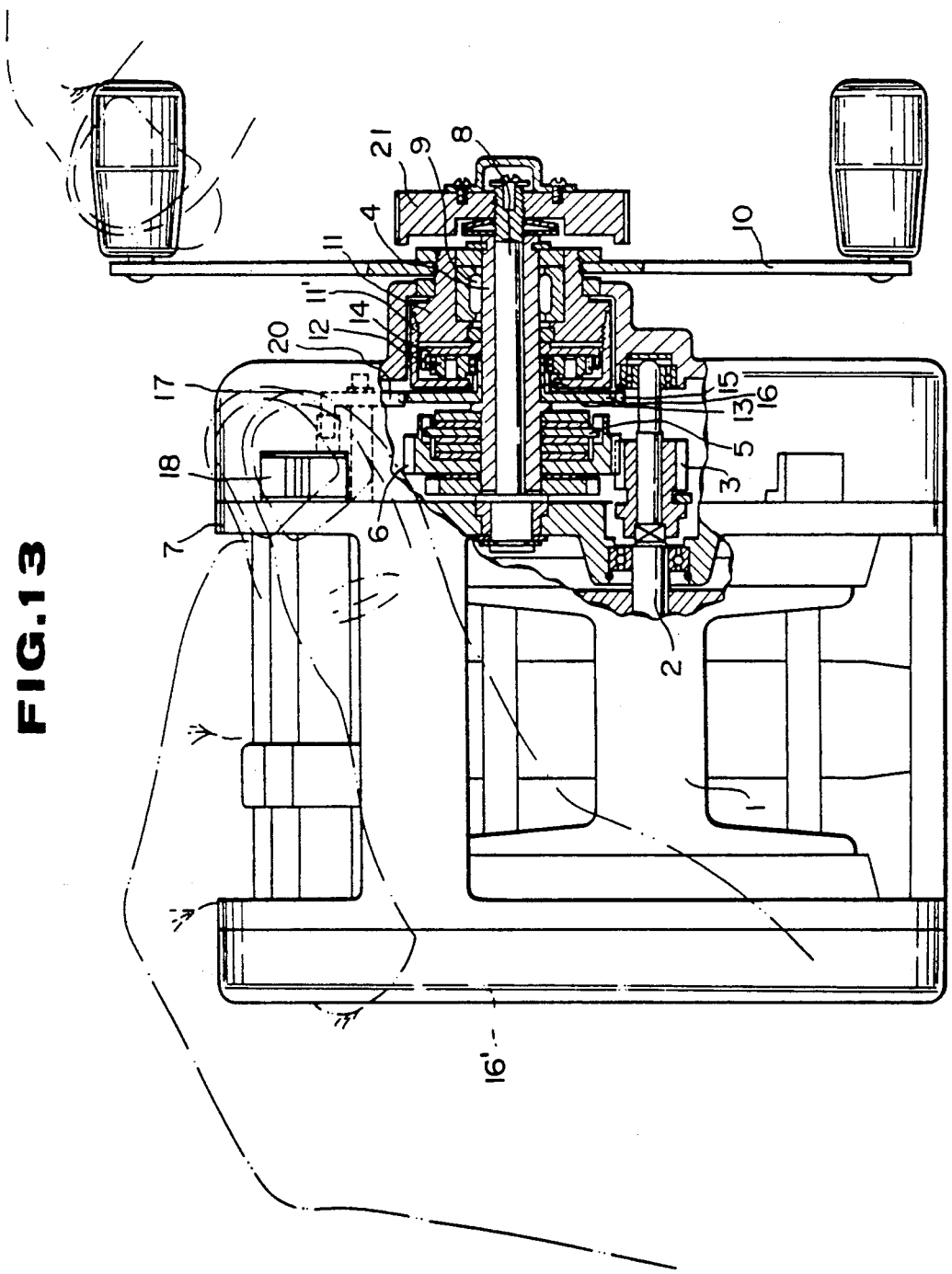
FIG. 13 is a partially sectioned plan of a further embodiment of the present invention.
Figure 14:
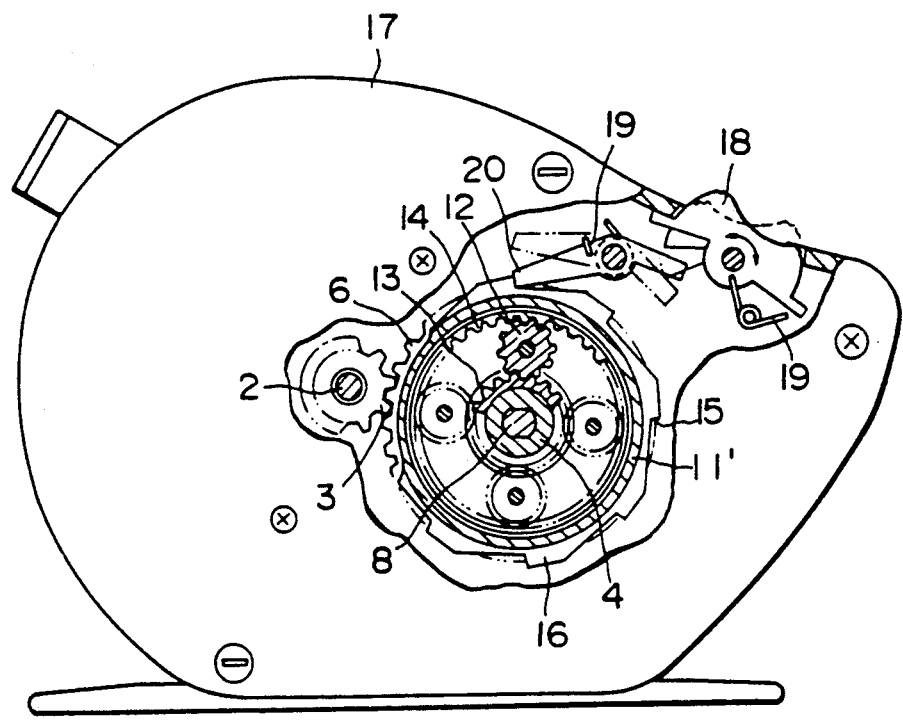
FIG. 14 is a partially cutaway view in side elevation of the embodiment of FIG. 13.

In an embodiment shown in FIGS. 13-14, an operating member 18 for operating a stopper pawl 20 is provided at the upper front portion of the section of a reel side plate 17 which is on the side of a handle 10. The handle 10 is operated by one hand a reel body is held by the other hand with the thumb placed on the upper surface of the upper front portion of the reel side plate 17, to carry out a fishing operation. During this operation, the take-up speed can be changed speedily to a high or low level by turning the operating member 18 quickly by the thumb placed on the reel side plate 17.

In the above embodiments, the spool is fitted firmly around the spool shaft so that the spool and spool shaft are turned unitarily. The present invention can, of course, be applied to a double bearing type reel in which a spool is supported rotatably on a spool shaft via bearings, and to a fixed spool shaft in a single bearing type reel as necessary.

The present invention is not, of course, limited to the above embodiments; it may be modified in various ways within the scope of the appended claims.

What is claimed is:

1. A speed changer for fishing reels, comprising a driving gear-carrying driving shaft having a driving gear mounted thereon, a handle-carrying handle-turned tube mounted on an outer portion of said driving shaft via a one-way clutch so that said handle-turned tube can be turned unitarily with said driving shaft in a fishing line take-up direction, a spool-turning spool shaft and a pinion mounted on said spool-turning spool shaft, with which pinion said driving gear is meshed, planetary gears supported rotatably on shafts extending from an inner end portion of said handle-turned tube, an internal gear mounted on and rotatable with said driving shaft, with which internal gear outer portions of said planetary gears are meshed, a sun gear fitted rotatably around said driving shaft, with which sun gear inner portions of said planetary gears are meshed, a change-over member having locking teeth at its outer circumferential portion and formed unitarily with said sun gear, a stopper pawl pivotally mounted to contact said locking teeth in one position and contacted by an operating member so that said stopper pawl can be engaged with said locking teeth to stop rotation of said change-over member, and disengaged from said locking teeth, by said operating member, and a brake member engaged with said locking teeth of said change-over member, which provides a braking force resisting rotation of said change-over member, and means to regulate said braking force, said brake member being supported pivotably on a reel side plate via a support shaft spaced from said handle-turned tube.

2. A speed changer for fishing reels according to claim 1, wherein said means to regulate said braking force includes a frictional member engaging said brake member to resist rotation of said change-over member.

3. A speed changer for fishing reels according to claim 1, wherein said means to regulate said braking force includes a spring which biases said brake member toward said locking teeth, and means to regulate the biasing force of the spring.

4. A speed changer for fishing eels according to claim 1, wherein said driving gear is mounted on said driving shaft via another frictional brake member so that the driving shaft-binding force of said driving gear is transmitted frictionally to said driving shaft by said other frictional brake member.

5. A sped changer for fishing reels according to claim 1, wherein said operating member for engaging and disengaging said stopper pawl with and from said locking teeth is provided at an upper portion of a handle-side reel side plate on the front side of said spool shaft, said operating member being operable by the thumb of one hand holding a reel body, with the other hand operating said handle.

* * * * *